US008409417B2

(12) United States Patent
Wu

(10) Patent No.: US 8,409,417 B2
(45) Date of Patent: Apr. 2, 2013

(54) ELECTROWETTING BASED DIGITAL MICROFLUIDICS

(75) Inventor: Chuanyong Wu, Menlo Park, CA (US)

(73) Assignee: Digital Biosystems, Menlo Park, CA (US)

( * ) Notice: Subject to any disclaimer, the term of this patent is extended or adjusted under 35 U.S.C. 154(b) by 194 days.

(21) Appl. No.: 12/599,803

(22) PCT Filed: May 27, 2008

(86) PCT No.: PCT/US2008/006709

§ 371 (c)(1), (2), (4) Date: Aug. 12, 2010

(87) PCT Pub. No.: WO2008/147568

PCT Pub. Date: Dec. 4, 2008

(65) Prior Publication Data

US 2010/0307922 A1 Dec. 9, 2010

Related U.S. Application Data

(60) Provisional application No. 60/940,020, filed on May 24, 2007.

(51) Int. Cl.
*B03C 5/02* (2006.01)
*G01N 27/00* (2006.01)

(52) U.S. Cl. ........................................ 204/643; 204/600

(58) Field of Classification Search .......... 204/450–470, 204/546–550, 600–621, 641–645
See application file for complete search history.

(56) References Cited

U.S. PATENT DOCUMENTS 6,113,768 A 9/2000 Fuhr et al.
6,294,063 B1 9/2001 Becker et al.
6,826,968 B2 * 12/2004 Manaresi et al. ........ 73/862.046
6,911,132 B2 6/2005 Pamula et al.
7,052,244 B2 * 5/2006 Fouillet et al. .................. 417/48
7,163,612 B2 1/2007 Sterling et al.

(Continued)

FOREIGN PATENT DOCUMENTS

EP 1371989 A1 12/2003
EP 1643231 A1 4/2006

(Continued)

OTHER PUBLICATIONS

Fan, S-K. et al., "Manipulation of Multiple Droplets on NxM Grid By Cross-Reference EWOD Driving Scheme and Pressure-Contact Packaging,".

(Continued)

*Primary Examiner* — Alex Noguerola
*Assistant Examiner* — Maris R Kessel
(74) *Attorney, Agent, or Firm* — Fenwick & West LLP

(57) ABSTRACT

Apparatus and methods are provided for liquid manipulation utilizing electrostatic field force. The apparatus is a single-sided electrode design in which all conductive elements are embedded on the first surface on which droplets are manipulated. An additional second surface can be provided parallel with the first surface for the purpose of containing the droplets to be manipulated. By performing electrowetting based techniques in which different electrical potential values are applied to different electrodes embedded in the first surface in a controlled manner, the apparatus enables a number of droplet manipulation processes, including sampling a continuous liquid flow by forming individually controllable droplets from the flow, moving a droplet, merging and mixing two or more droplets together, splitting a droplet into two or more droplets, iterative binary mixing of droplets to obtain a desired mixing ratio, and enhancing liquid mixing within a droplet.

11 Claims, 9 Drawing Sheets

U.S. PATENT DOCUMENTS

| | | | | |
|---|---|---|---|---|
| 2002/0172969 | A1 | 11/2002 | Burns et al. | |
| 2003/0164295 | A1* | 9/2003 | Sterling | 204/450 |
| 2003/0173223 | A1 | 9/2003 | Gascoyne et al. | |
| 2004/0055891 | A1 | 3/2004 | Pamula et al. | |
| 2004/0211659 | A1* | 10/2004 | Velev | 204/164 |
| 2007/0141593 | A1 | 6/2007 | Lee et al. | |
| 2007/0241068 | A1 | 10/2007 | Pamula et al. | |
| 2008/0169197 | A1* | 7/2008 | McRuer et al. | 204/600 |

FOREIGN PATENT DOCUMENTS

WO WO 2006/044966 A1 4/2006

OTHER PUBLICATIONS

PCT International Search Report and Written Opinion, PCT/US2008/006709, Aug. 19, 2008, 6 Pages.

Chinese Second Office Action, Chinese Application No. 200880016986.4, Nov. 2, 2011, 6 pages.

Chinese Office Action, Chinese Application No. 200880016986.4, Feb. 24, 2011, 15 pages.

European Extended Search Report, European Application No. 08754752.7, Feb. 14, 2011, 6 pages.

Fan, S-K. et al., "Manipulation of Multiple Droplets on NxM Grid By Cross-Reference EWOD Driving Scheme and Pressure-Contact Packaging," 2003.

Moesner, F.M. et al., "Devices for Particle Handling by an AC Electric Field," Proceedings of the Workshop on Micro Electrical Mechanical Systems, IEEE, Jan. 29, 1995, pp. 66-71.

PCT International Search Report and Written Opinion, PCT/US2008/068651, Sep. 22, 2008, 6 pages.

Chinese Third Office Action, Chinese Application No. 200880016986.4, Jun. 29, 2012, 6 pages.

* cited by examiner

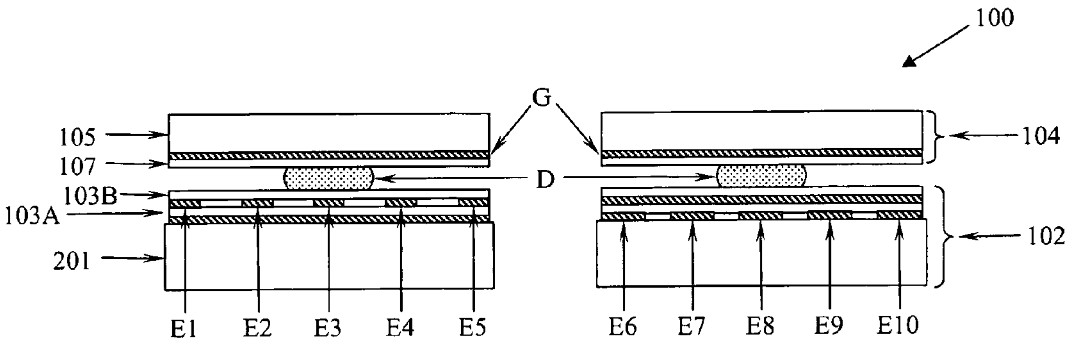
Fig. 1A
Fig. 1B
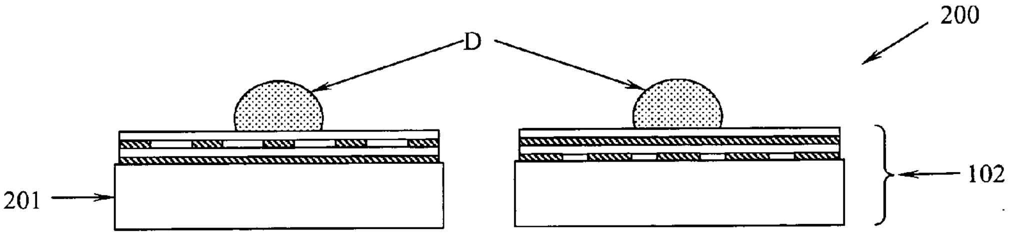
Fig. 2A
Fig. 2B

ELECTROWETTING BASED DIGITAL MICROFLUIDICS

This application is the National Stage of International Application No. PCT/US2008/006709, filed May 27, 2008, and claims the benefit of U.S. Provisional Application No. 60/940,020, filed May 24, 2007, both of which are incorporated by reference in their entirety.

CROSS-REFERENCE TO RELATED APPLICATIONS

This application claims the benefit of U.S. Provisional Patent Application No. 60/940,020, filed on May 24, 2007, and which is herein incorporated by reference in its entirety.

TECHNICAL FIELD

The present invention is related to the field of liquid droplet manipulation, such as droplet-based sample preparation, mixing and dilution on a microfluidic scale. More specifically, the present invention is electrowetting based.

INTRODUCTION

During the past decade or so, there has been great interest in developing microfluidic based devices, often referred to as Lab-on-a-Chip (LoC) or Micro Total Analysis Systems (μTAS), with goals of minimal reagent usage, shorter measurement turn around time, lower experiment cost, and higher data quality, etc. Microfluidics finds it applications in printing, fuel cell, digital display, and life sciences, etc. With the major interest of applying this invention in life science related fields, the immediate applications include drug screening, medical diagnostics, environmental monitoring, and pandemics prevention, etc.

Microfluidics can be broadly categorized into channel-based continuous-flow, including droplets-in-microfluidic-channel systems from organizations such as Raindance Technologies, inc., and droplet-based digitized-flow architectures. A channel-based system intrinsically carries a few disadvantages. First, permanently etched structures are needed to physically confine the liquid and to guide the fluid transport. This makes the chip design application specific. In other words, a universal chip format is impossible to implement. Second, the transport mechanisms of a channel-based system are usually pressure-driven by external pumps or centrifugal equipments, and/or electrokinetically-driven by high voltage power supplies, etc. This generally makes it difficult to design a low power self-contained system based on this architecture.

To overcome the shortcomings of the channel-based system, people turned to droplet-based architecture—an electrowetting driven technology dated back to the $19^{th}$ century. One representative design is to have a two dimensional individually electrically controllable patches in a single electrode layer with electrical connections to each electrode formed from the same layer (seen in U.S. Pat. No. 6,911,132 to Pamula et al). By programming the driving electrodes in certain sequence, droplet manipulation functions such as dispensing, splitting, merging and transporting, can be implemented. This invention quickly finds its limitations when a system calls for more driving electrodes. First, to routing all control signals in a single layer can be challenging for a system with significant complexity, while the cost goes up as the number of layers goes up when routing control signals using multi-layer design. Second, the number of control signals needed is the same as the number of controllable electrodes, which increases very quickly as the number of column and/or row increases. For example, the number of control electrodes needed for a 100×100 (100 rows and 100 columns) array is 10000. This makes the implementation of this control scheme difficult to scale up. Another design example is to have two single-electrode-layer chips separated by a small gap, with orthogonal arrangement of the electrodes on the two chips (Fan et al, IEEE Conf. MEMS, Kyoto, Japan, January 2003). Unfortunately, with this scheme, it's a big challenge to localize the electrowetting effect to one or a few targeted droplets. For example, with multiple droplets present along the same column or row, some droplets might undergo unintentional or unpredictable move when trying to move other droplets. Also, the fact that both the substrate and the cover plate contain control electrodes makes the electrical interface to the chip and packaging more complicated.

Presented here is believed to be a breakthrough in electrowetting based droplet manipulations. By controlling M+N (M plus N) electrodes, with M being the number of rows and N number of columns, droplets can be manipulated on an array with dimension of N×M (M times N) with operations including droplets dispensing, transporting, merging, mixing and splitting.

SUMMARY

The present invention provides droplet-based liquid handling and manipulation devices and methods by utilizing electrowetting based techniques. The droplets with size ranges from sub-picoliter to a few milliliters can be manipulated by controlling voltages to the electrodes. Without being bound to theory, the actuation mechanism of the droplet is the manifestation of the electrostatic force exerted by a non-uniform electric field on polarizable media—the voltage-induced electrowetting effect. The mechanisms of the invention allow the droplets to be transported while also acting as virtual chambers for mixing to be performed anywhere on the chip. The chip can include arrays of control electrodes that are reconfigurable during run-time to perform desired tasks. The invention enables several different types of handling and manipulation tasks to be performed on independently controllable droplet samples, reagents, diluents, and the like. These tasks conventionally have been performed on continuous liquid flows. These tasks include actuation or movement, monitoring, detection, irradiation, incubation, reaction, dilution, mixing, dialysis, analysis, and the like. Moreover, the methods of the invention can be used to form droplets from a continuous-flow liquid source, such as from a continuous input provided at the microfluidic chip. Accordingly, this invention provides a method for continuous sampling by discretizing or fragmenting a continuous flow into a desired number of uniformly sized, independently controllable droplet units.

The partitioning of liquids into discrete, independently controlled packets or droplets for microscopic manipulation provides several important advantages over continuous-flow systems. For instance, the reduction of fluid manipulation, or fluidics, to a set of basic, repeatable operations (for example, moving one unit of liquid one unit step) allows a hierarchical and cell-based design approach that is analogous to digital electronics.

In addition to the advantages identified hereinabove, the present invention utilizes electrowetting as the mechanism for droplet manipulation for the follow advantages.

(a) Improved control of a droplet's position with reduced number of control electrodes.

(b) High parallelism capability with a compact electrode array layout.

(c) Reconfigurability (d) Mixing-ratio control using programming operations, yielding better controllability and higher accuracy in mixing ratio.

(e) High throughput capability, providing enhanced parallelism.

(f) Enabling of integration with measurements such as optical detection that can provide further enhancement on asynchronous controllability and accuracy.

In particular, the present invention provides a sampling method that enables droplet-based sample preparation and analysis. The present invention fragments or discretizes the continuous liquid flow into a series of droplets of uniform size on or in a microfluidic chip or other suitable structure by inducing and controlling electrowetting phenomena. The liquid is subsequently conveyed through or across the structure as a train of droplets which are eventually recombined for continuous-flow at the output, deposited at a collection reservoir, or diverted from the flow channels for analysis. Alternatively, the continuous-flow stream may completely traverse the structure, with droplets removed or sampled from specific location along the continuous flow for analysis. In both cases, the sampled droplets can then be transported to particular areas of the structure for analysis. Thus, the analysis is carried out on-line, allowing the analysis to be decoupled from the main flow.

Once removed from the main flow, a facility exists for independently controlling the motion of each droplet. For purposes of chemical analysis, the sample droplets can be combined and mixed with droplets containing specific chemical reagents formed from reagent reservoirs on or in adjacent to the chip or other structure. Multiple-step reactions or dilutions might be necessary in some cases with portions of the chip assigned to certain functions such as mixing, reacting or incubation of droplets. Once the sample is prepared, it can be transported by electrowetting to another portion of the chip dedicated to detection or measurement of the analyte. The detection can be, for example, using enzymatic systems or other biomolecular recognition agents, and be specific for particular analytes or optical systems, such as fluorescence, phosphorescence, absorbance, Raman scattering, and the like. The flow of droplets from the continuous flow source to the analysis portion of the chip is controlled independently of the continuous flow, allowing a great deal of flexibility in carrying out the analyses.

Methods of the present invention use means for forming droplets from continuous flow and for independently transporting, merging, mixing, and other operations of the droplets. The preferred embodiment uses electrowetting to accomplish these manipulations. In one embodiment, the liquid is contained within a space between two parallel plates. One plate contains two layers of drive electrodes, while the other contains a single continuous electrode (or multiple electrodes) that is grounded or set to a reference potential. Hydrophobic insulation covers the electrodes and an electric field is generated between electrodes on opposing plates. This electric field creates a surface tension gradient that causes a droplet to change shape and to move towards a desired electrode at a desired direction. Through proper arrangement and control of the electrodes, a droplet can be transported by successively transferring it between adjacent electrodes. The patterned electrodes can be arranged so as to allow transport of a droplet to any location covered by the electrodes. The space surrounding the droplets may be filled with a gas such as air or nitrogen, or an immiscible fluid such as silicone oil.

Droplets can be combined together by transporting them simultaneously onto the same position. Droplets are subsequently mixed either passively or actively. Droplets are mixed passively by diffusion. Droplets are mixed actively by moving or "shaking" the combined droplet by taking advantage of the electrowetting phenomenon.

Droplets can be split off from a larger droplet in the following manner: at least two parallel electrodes adjacent to the edge of the droplet are energized along with an electrode directly beneath the droplet, and the droplet moves so as to spread across the extent of the energized electrodes. The intermediate electrode is then de-energized to create a hydrophobic region between two effectively hydrophilic regions, thereby creating two new droplets.

Droplets can be created from a continuous body of liquid in the following manner: at least the electrode with portion directly beneath the liquid body is energized, and the liquid moves so as to spread across the extent of the energized electrode. This is followed by energizing at least one perpendicular electrode with portion directly beneath the newly extended segment of the liquid, which makes the liquid move to spread across certain portion of this newly energized electrode. The removal of the voltages on the first energized electrode and, after a defined time delay, on the second energized electrode will create one or more new droplets.

BRIEF DESCRIPTION OF THE DRAWINGS

FIGS. 1A and 1B are two cross-sectional views, 90 degrees relative to each other, of an electrowetting microactuator mechanism having a two-sided electrode configuration in accordance with the present invention.

FIGS. 2A and 2B are two cross-sectional views, 90 degrees relative to each other, of an electrowetting microactuator mechanism having a single-sided electrode configuration in accordance with the present invention.

FIG. 9A-9F are sequential schematic views of a droplet being moved by the electrowetting technique of the present invention, while another droplet resides on one of the electrodes which the object droplet resides on.

DETAILED DESCRIPTION OF THE INVENTION

Figure 3:
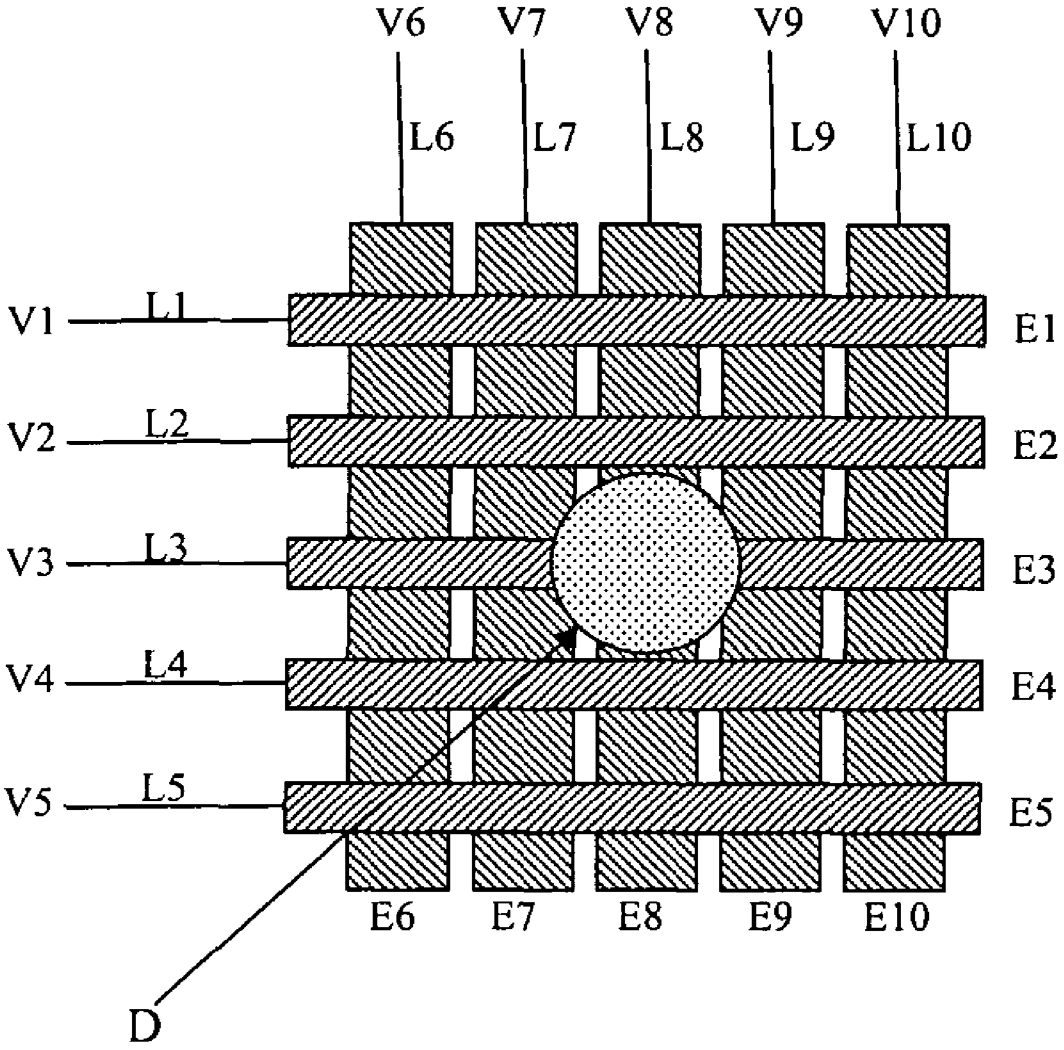
FIG. 3 is a top plan view of the electrodes embedded on the substrate surface.

For purposes of the present disclosure, the terms "layer" and film" are used interchangeably to denote a structure of body that is typically but not necessarily planar or substantially planar, and is typically deposited on, formed on, coated on, or is otherwise disposed on another structure.

For purposes of the present disclosure, the term "communicate" (e.g., a first component "communicates with" or "is in communication with" a second component) is used herein to indicate a structural, functional, mechanical, electrical, optical, or fluidic relationship, or any combination thereof, between two or more components or elements. As such, the fact that one component is said to communicate with a second component is not intended to exclude the possibility that additional components may be present between, and/or operatively associated or engaged with, the first and the second components.

For purposes of the present disclosure, it will be understood that when a given component such as a layer, region or substrate is referred to herein as being disposed or formed "on", "in" or "at" another component, that given component can be directly on the other component or, alternatively, intervening components (e.g., one or more buffer layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating particular methods of material transport, deposition, or fabrication.

For purposes of the present disclosure, it will be understood that when a liquid in any form (e.g., a droplet or a continuous body, whether moving or stationary) is described as being "on", "at", or "over" an electrode, array, matrix or surface, such liquid could be either in direct contact with electrode/array/matrix/surface, or could be in contact with one or more layers or films that are interposed between the liquid and the electrode/array/matrix/surface.

As used herein, the term "reagent" describes any material useful for reacting with, diluting, solvating, suspending, emulsifying, encapsulating, interacting with, or adding to a sample material.

As used herein, the term "electronic selector" describes any electronic device capable to set or change the output signal to different voltage or current levels with or without intervening electronic devices. As a non-limiting example, a microprocessor along with some driver chips can be used to set different electrodes at different voltage potentials at different times.

As used herein, the term "ground" in the context of "ground electrode" or "ground voltage" indicates the voltage of corresponding electrode(s) is set to zero or substantially close to zero. All other voltage values, while typically less than 300 volts in amplitude, should be high enough so that substantially electrowetting effect can be observed. These voltages can be AC or DC voltages. When using an AC voltage, the frequency is typically less than 100 KHz. One of skill in the art will recognize that an increase in the frequency of an applied AC voltage (hence the applied electric field) causes the dielectrophoretic effect to become more pronounced. Since it is not the purpose of this invention to quantify the contribution of the electrowetting effect or the dielectrophoretic effect when operating a droplet, the use of electrowetting throughout this document represents the electromechanical effect coming from the applied voltages while dielectrophoretic effect is implied especially when the applied voltages are at higher frequency.

It should be pointed out that the spaces between adjacent electrodes at the same layer are generally filled with the dielectric material when the covering dielectric layer is disposed. These spaces can also be left empty or filled with gas such as air or nitrogen. All the electrodes at the same layer, as well as electrodes at different layers, are preferably electrically isolated.

The droplet-based methods and apparatus provided by the present invention will now be described in detail, with reference being made as necessary to the accompanying FIGS. 1A-9F.

Droplet-Based Actuation by Electrowetting

Referring now to FIGS. 1A, 1B, 2A and 2B, electrowetting microactuator mechanisms, generally designated 100 and 200, respectively, are illustrated as two preferred embodiments for effecting electrowetting based manipulations on a droplet D without the need for pumps, valves, or fixed channels. Droplet D is electrolytic, polarizable, or otherwise capable of conducting current or being electrically charged. In one embodiment, as shown in FIGS. 1A and 1B, droplet D is sandwiched between a lower plate, generally designated 102, and an upper plate, generally designated 104. The terms "upper" and "lower" are used in the present context only to distinguish these two planes 102 and 104, and not as a limitation on the orientation of the planes 102 and 104 with respect to the horizontal. In the other embodiment, as shown in FIGS. 2A and 2B, droplet D resides on one plate, generally designated 102. In both embodiments, plate 102 comprises two elongated arrays, perpendicular to each other, of control electrodes. By way of example, two sets of five control electrodes E (specifically E1, E2, E3, E4, E5, E6, E7, E8, E9 and E10) are illustrated in FIGS. 1A and 1B. It will be understood that in the construction of devices benefiting from the present invention (such as a microfluidic chip), control electrodes E1 to E10 will typically be part of a larger number of control electrodes that collectively form a two-dimensional electrode array or grid.

The material for making the substrate or the cover plate is not important so long as the surface where the electrodes are disposed is (or is made) electrically non-conductive. The material should also be rigid enough so that the substrate and/or the cover plate can substantially keep their original shape once made. The substrate and/or the cover plate can be made of (not limited to) quartz, glass, or polymers such as polycarbonate (PC) and cyclic olefin copolymer (COC).

The number of electrodes can range from 2 to 100,000, but preferably from 2 to 10,000, and more preferably from 2 to 200. The width of each electrode or the spacing between adjacent electrodes in the same layer can range from approximately 0.005 mm to approximately 10 mm, but preferably from approximately 0.05 mm to approximately 2 mm. The typically distance between the substrate plate and the upper plate is between approximately 0.005 mm to approximately 1 mm.

The electrodes can be made of any electrically conductive material such as copper, chrome and indium-tin-oxide (ITO), and the like. The shape of the electrodes illustrated in the Figures is displayed as elongated rectangles for convenience, however, the electrodes can take many other shapes to have substantially similar electrowetting effects. Each edge of an electrode can be straight (as shown in the Figures), curved, or jagged, etc. While the exact shape of each electrode is not critical, the electrodes at the same layer should be substantially similar in shape and should be substantially parallel with each other. The materials for the dielectric layers 103A, 103B and 107 can be (but not limited to) Teflon, Parylene C and silicon dioxide, and the like. Preferably, the surface of layers 103B and 107 is hydrophobic. This can be achieved (not limited to) by coating layers 103B and 107 with a thin layer of Teflon or other hydrophobic materials. Layers 103B and 107 can also be made hydrophobic or superhydrophobic with textured surface using surface morphology techniques.

It should be pointed out that although the electrowetting effects described in this invention are achieved using electrodes in two layers. Substantially similar electrowetting effects can be achieved using electrodes in more layers. As a non-limiting example, the second electrode array can be separated to two layers of electrode sub-arrays separated by a thin layer by a dielectric layer by keeping the horizontal spacing between the adjacent electrodes substantially the same, while the final electrowetting effects will still be substantially similar.

Control electrodes E1 through E10 are embedded in or formed on a suitable lower or first substrate or plate 201. A thin lower layer 103A of dielectric material is applied to lower plate 201 to electrically isolate control electrodes at two different layers and at the same layer (E1 to E5). Another thin lower layer 103B of hydrophobic insulation is applied to lower plate 201 to cover and thereby electrically isolate control electrodes E6 to E10. Upper plane 104 comprises a single continuous ground electrode embedded in or formed on a suitable upper substrate or plate 105. Preferably, a thin upper layer 107 of hydrophobic insulation is also applied to upper plate 105 to isolate ground electrode G.

Control electrodes E1 to E10 are placed in electrical communication with suitable voltages sources V1 to V10 through conventional conductive lead lines L1 to L10, as shown in FIG. 3. Voltage sources V1 to V10 are independently controllable, but could also be connected to the same voltage source, in which case mechanisms like switches will be needed to make sure at least some of the electrodes can be selectively energized. In other embodiments, or in other areas of the electrode arrays, two or more control electrodes E can be commonly connected so as to be activated together.

The structure of electrowetting microactuator mechanism 100 can represent a portion of a microfluidic chip, on which conventional microfluidic and/or microelectronic components can also be integrated. As example, the chip could also include resistive heating areas, microchannels, micropumps, pressure sensors, optical waveguides, and/or biosensing or chemosensing elements interfaced with MOS (Metal Oxide Semiconductor) circuitry.

Figure 4A:
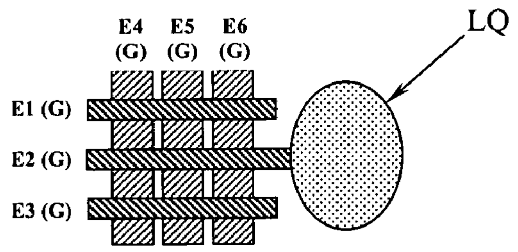
FIG. 4A-4D are sequential schematic views of a droplet being dispensed from a reservoir by the electrowetting technique of the present invention.
Figure 4B:
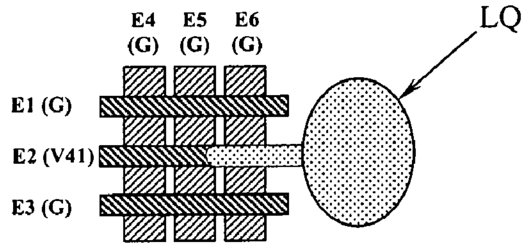
Figure 4C:
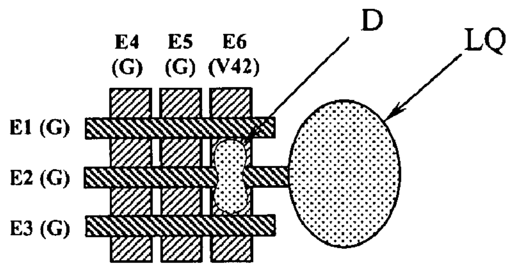
Figure 4D:
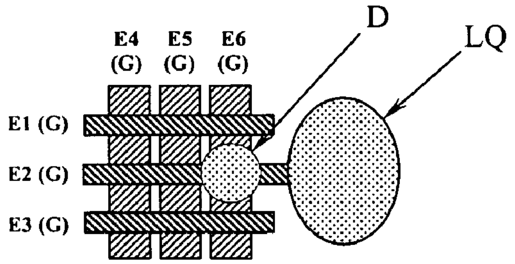

FIGS. 4A-4D illustrate a basic DISCRITIZE operation. As shown in FIG. 4A, a continuous flow of liquid LQ, such as a reservoir, resides directly above one portion of a control electrode E2. By setting voltage potential of E2 to certain activation value V41, liquid from LQ starts to flow along E2, as shown in FIG. 4B. After a predefined time delay, E6, which goes under the portion of the extended liquid element along E2, is set to voltage potential V42 followed by deactivating control electrode E2. This makes the extended fluid going back to the continuous flow except a portion of it D stays around cross section of E2 and E6, as shown in FIG. 4C. The removal of E6 voltage potential causes the droplet D change to circular shape, as shown FIG. 4D. This process can be repeated along with MOVE operation described next to create a train of droplets on the array. By operating the electrodes and the corresponding timings in a controlled manner, droplets can be created with substantially the same size.

Figure 5A:
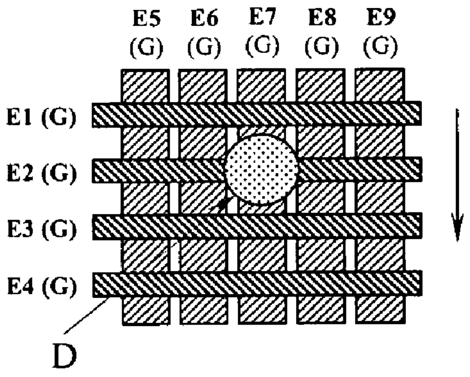
FIG. 5A-5E are sequential schematic views of a droplet being moved by the electrowetting technique of the present invention.
Figure 5D:
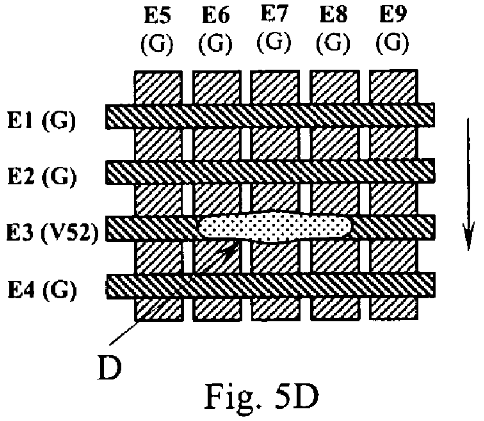
Figure 5B:
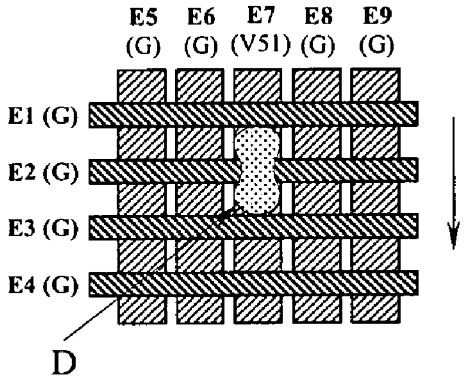
Figure 5E:
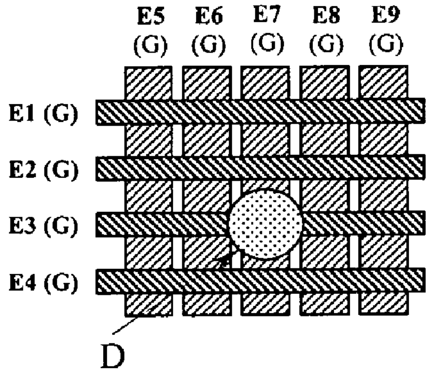
Figure 5C:
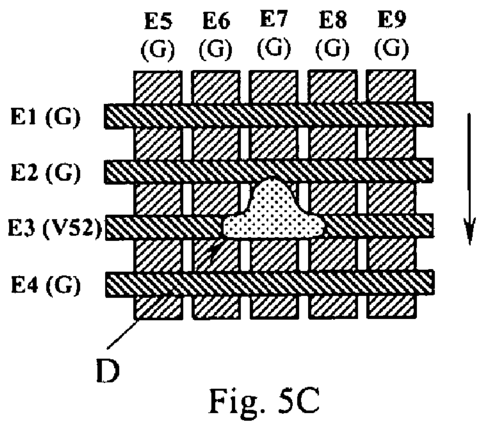

FIGS. 5A-5E illustrate a basic MOVE operation. FIG. 5A illustrates a starting position at which droplet D resides at the cross section of two control electrodes E2 and E7. Initially, control electrodes adjacent to the droplet are all grounded, generally designated G, so that droplet D is stationary and in equilibrium at E2 and E7 cross section. To move droplet D in the direction indicated by the arrows in FIGS. 5A-5D, control electrode E7 is energized by setting to voltage V51 to deform droplet D along E7 direction centered at E2, as shown in FIG. 5B. Subsequent activation of control electrode E3 by setting it to voltage V52, followed by removal of the voltage potential at control electrode E7, causes droplet D to move onto E3 and then expand along electrode E3 centered at E7, as shown in FIGS. 5C and 5D. The removal of the voltage potential at control electrode E3, causes droplet D returns to its equilibrium circular shape at cross point of control electrodes E3 and E7.

Figure 6A:
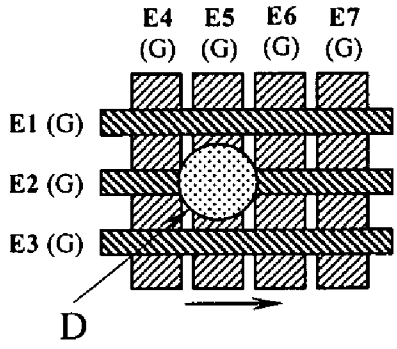
FIG. 6A-6E are sequential schematic views of a droplet being moved along a perpendicular direction with respect to the droplet motion direction in FIG. 5A-5E by the electrowetting technique of the present invention.
Figure 6D:
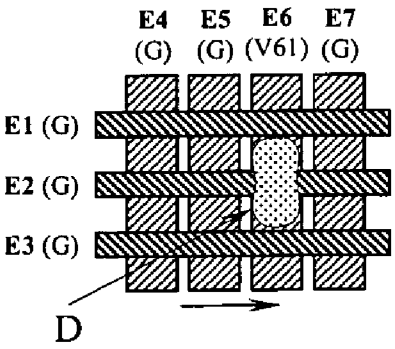
Figure 6B:
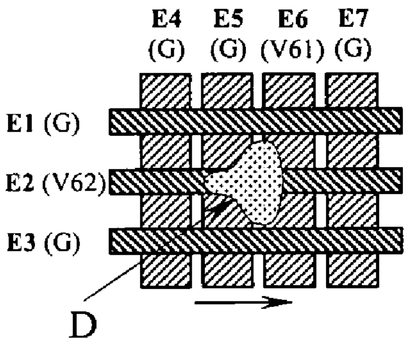
Figure 6E:
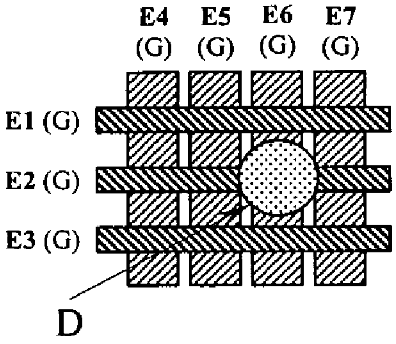
Figure 6C:
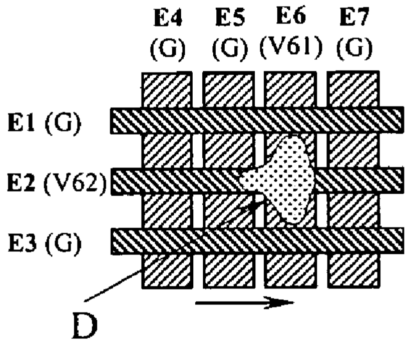

FIGS. 6A-6E illustrate a MOVE operation that is along a perpendicular direction on the substrate surface. FIG. 6A illustrates a starting position at which droplet D resides at the cross section of two control electrodes E2 and E5. Initially, control electrodes adjacent to the droplet are all grounded, generally designated G, so that droplet D is stationary and in equilibrium at E2 and E5 cross section. To move droplet D in the direction indicated by the arrows in FIGS. 6A-6D, control electrode E6 is energized by setting to voltage V61 followed by setting control electrode E2 to voltage V62 to deform and move droplet D along E2 on to E6, as shown in FIGS. 6B and 6C. Subsequent removal of voltage potential at control electrode E2 causes droplet D to become symmetric both along the center line of E6 and the center line of E2, as shown in FIG. 6D. The removal of the voltage potential at control electrode E6 causes droplet D returns to its equilibrium circular shape at cross point of control electrodes E2 and E6.

In the above mentioned MOVE operations, the sequencing of electrodes activating and deactivating can be repeated to cause droplet D to continue to move in the desired direction indicated by the arrows. It will also be evident that the precise path through which droplet moves across the electrode array controlled surface is easily controlled by appropriately programming an electronic control unit (such as a microprocessor) to activate and deactivate selected electrodes of the arrays according to a predetermined sequence. Thus, for example, droplet D can be actuated to make right- and left-hand turns on the electrode array controlled substrate surface.

Figure 7A:
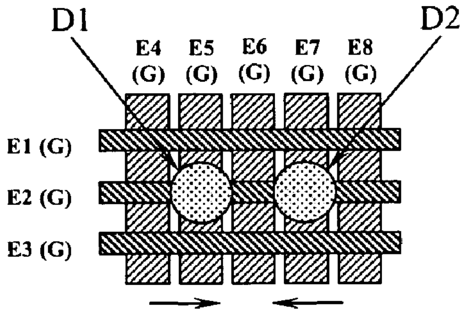
FIG. 7A-7D are sequential schematic views demonstrating two droplets combining into a merged droplet employing the electrowetting technique of the present invention.
Figure 7B:
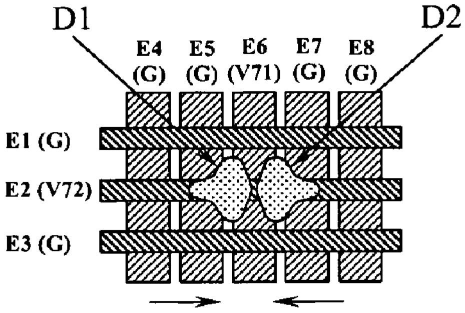
Figure 7C:
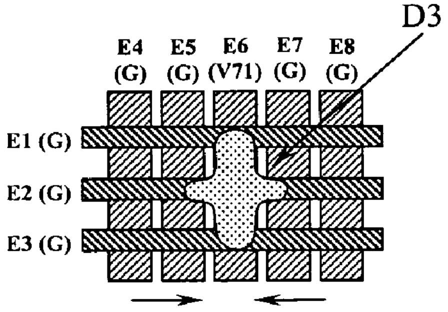
Figure 7D:
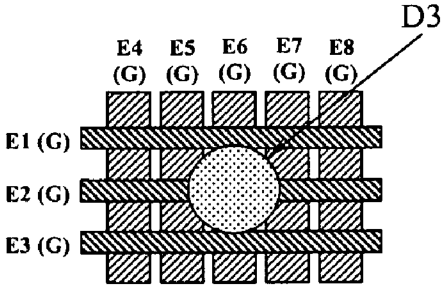

FIGS. 7A-7D illustrate a basic MERGE or MIX operation wherein two droplets D1 and D2 are combined into a single droplet D3. In FIG. 7A, two droplets D1 and D2 are initially positioned at cross sections of control electrodes E2/E5 and E2/E7 and separated by at least one intervening control electrode E6. Control electrode E6 is energized by setting to voltage V71 followed by setting control electrode E2 to voltage V62 to deform and move droplets D1 and D2 along E2 on to E6, as shown in FIG. 7B. The removal of voltage potential at control electrode E2 after the D1 and D2 merged into droplet D3, followed by the removal of voltage potential at control electrode E6 causes the merged droplet D3 to returns to the equilibrium circular shape at cross point of control electrodes E2 and E6.

Figure 8A:
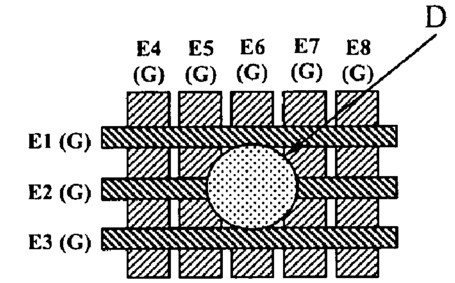
FIG. 8A-8D are sequential schematic views illustrating a droplet being split into two droplets utilizing the electrowetting technique of the present invention.
Figure 8B:
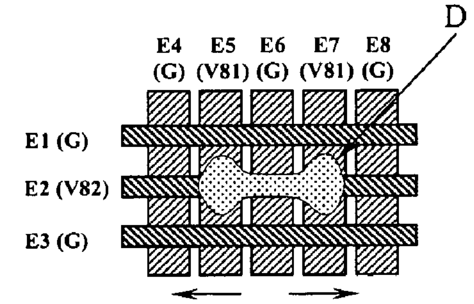
Figure 8C:
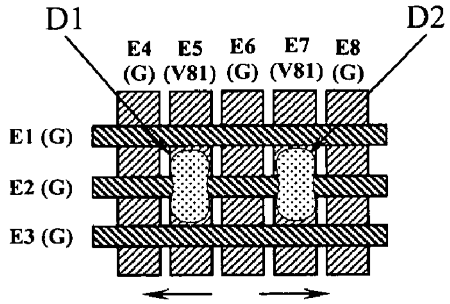
Figure 8D:
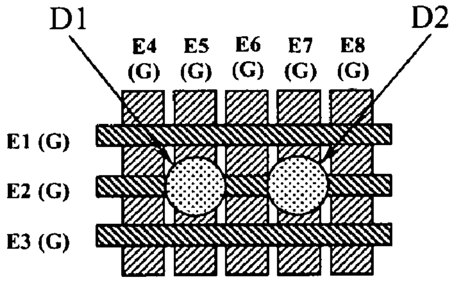

FIGS. 8A-8D illustrate a basic SPLIT operation wherein a droplet D is split into two droplets D1 and D2. Initially, control electrodes adjacent to droplet D can be all grounded, generally designated G, so that droplet D is stationary and in equilibrium at E2 and E6 cross section. To split droplet D shown in FIGS. 8A-8D, control electrodes E5 and E7 are energized by setting to voltage V81 followed by setting control electrode E2 to voltage V82 to deform droplet D shown in FIG. 8B. Subsequent removal of voltage potential at control electrode E2 causes droplet D to split at around E2 and E6 cross section, as shown in FIG. 8C. The removal of the voltage potential at control electrodes E5 and E7 causes the two newly formed droplets D1 and D2 returns to their equilibrium circular shape at cross points of control electrodes E2 and E5 and of control electrodes E2 and E7, respectively. Split droplets D1 and D2 have the same or substantially the same volume, due in part to the symmetry of the physical components and structure of electrowetting micro actuator mechanism 100 and 200 (FIGS. 1A, 1B, 2A and 2B), as well as the equal voltage potentials applied to the outer control electrodes E5 and E7.

Figure 9A:
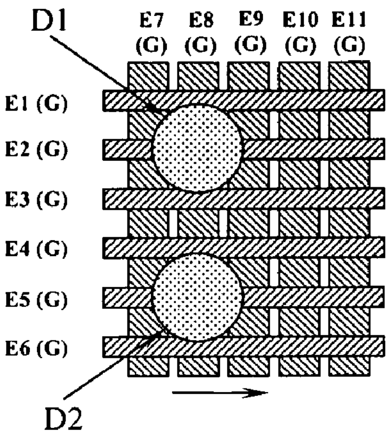
Figure 9B:
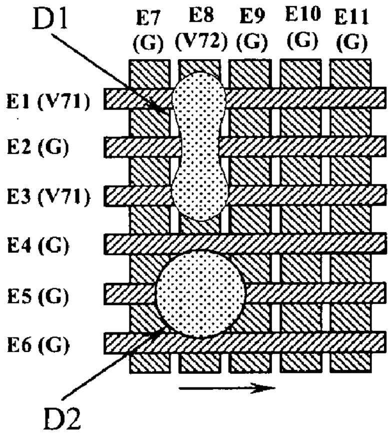
Figure 9C:
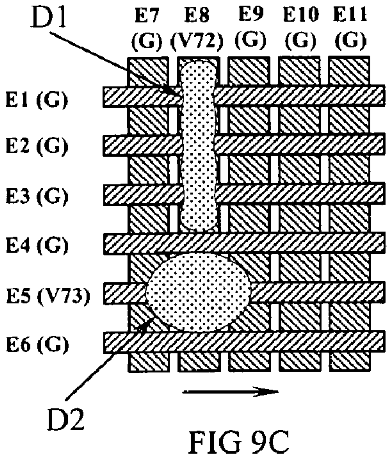
Figure 9D:
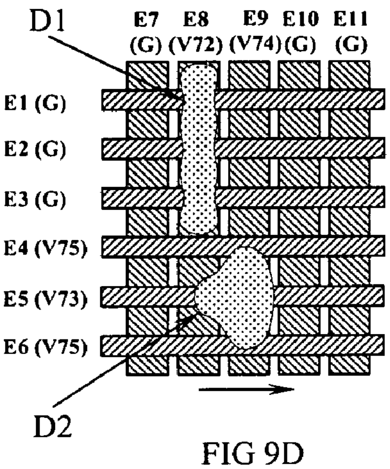
Figure 9E:
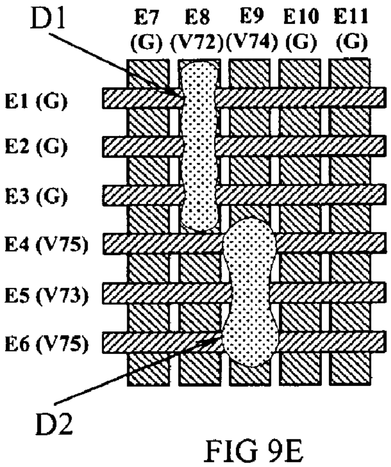
Figure 9F:
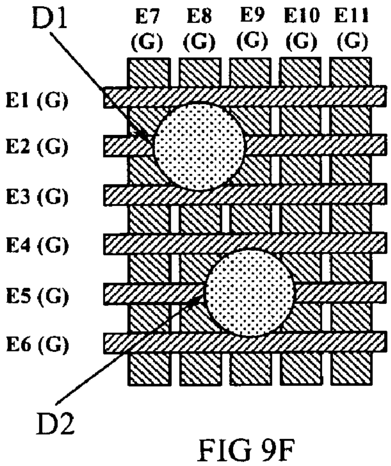

FIGS. 9A-9F illustrate a MOVE operation with another droplet present on one of the electrodes that go through the object droplet. FIG. 9A illustrates a starting positions at which droplet D1 resides at the cross section of two control electrodes E2 and E8, and droplet D2 resides at the cross section of two control electrodes E5 and E8. Initially, control electrodes adjacent to droplets D1 and D2 are all grounded, generally designated G, so that droplets D1 and D2 are stationary and in equilibrium at E2 and E8 and at E5 and E8 cross sections respectively. The following steps demonstrate a method to move droplet D2 in the direction indicated by the arrows in FIGS. 9A-9D, while keeping droplet D1 at its original position. First, both control electrodes E1 and E3 is energized by setting to voltage V71, followed by setting control electrode E8 to voltage V72 to deform droplet D1 along E8 direction centered around E2, as shown in FIG. 9B. Secondly, control E1 and E3 are set back to ground voltage G, and control electrode E5 is set to voltage V73. This makes droplets D1 and D2 deform along E8 and E5 respectively, as shown in FIG. 9C. Thirdly, control electrodes E9 is set to voltage V74 and both E4 and E6 are set to V75 to deform and move droplet D2, as shown in FIGS. 9D and 9E. Finally, the removal of voltage potentials at control electrodes E4, E6, E9, E5, and E8 cause droplets D1 and D2 return to their equilibrium circular shape cross points of E2/E8 and E5/E9. The preferred voltage removal sequence is E4 and E6 together, followed by E9, followed by E5, and then E8.

In FIGS. 3 to 9F, some or even all of the activation voltage potentials can have the same voltage value, and may be preferable in order to implement an electrical control system with less number of different control voltage values. However, the value of variables, such as the number of electrodes to be activated/deactivated, the sequences and time delays of the electrodes to be activated/deactivated, the voltages (both amplitude and frequency) to be applied, and the like, depend on many factors such as the mode of droplet operation, device configuration (such as electrode width and spacing, dielectric film thickness), droplet size, and the like. The variables and their values can be easily selected by a skilled artisan.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Droplet-based Sampling and Processing

Figure 10:
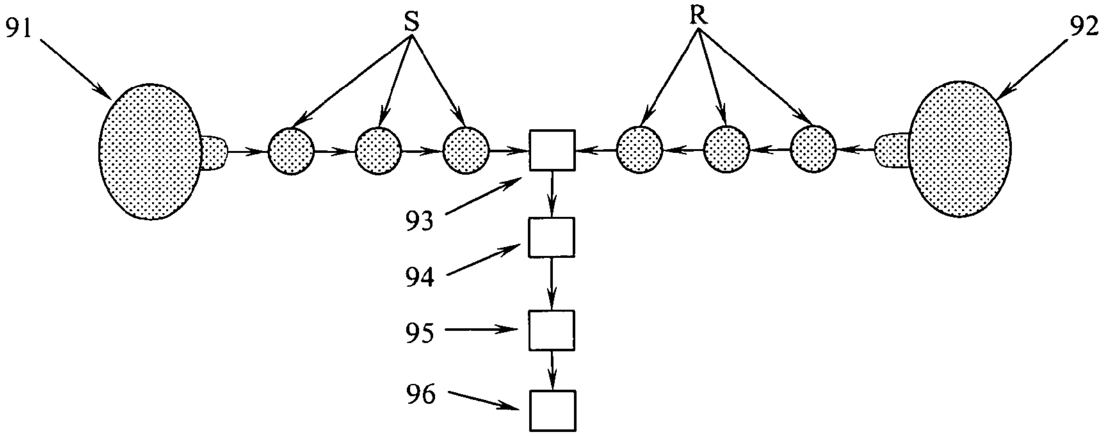
FIG. 10 is conceptual view of a possible use case of this invention—droplets are dispensed from continuous-flow sources, transported to different locations on the chip, mixed and reacted with other droplets. Measurement such as fluorescence measurement can also be done here.

Referring now to FIG. 10, a method for sampling and subsequently processing droplets from continuous-flow liquid input sources 91 and 92 is schematically illustrated in accordance with the invention. More particularly, the method enables the discretization of uniformly sized sample droplets S from reservoir 91 and reagent droplets R from reservoir 92 by means of electrowetting based techniques as described hereinabove, in preparation for subsequent droplet-based on-chip and/or off-chip procedures, such as mixing, incubation, reaction and detection, etc. In this context, the term "continuous" is taken to denote a volume of liquid that has not been discretized into smaller volume droplets. Non-limiting examples of continuous-flow inputs include capillary scale streams, slugs and aliquots introduced to a substrate surface from dispensing devices. Sample droplets S will typically contain an analyte substance of interest (a known molecule whose concentration is to be determined such as by spectroscopy). The several sample droplets S shown in FIG. 10 represent either separate sample droplets that have been discretized from continuous-flow source 91, or a single sample droplet S movable to different locations on the electrode arrays over time and along various flow paths available in accordance with the sequencing of the electrodes. Similarly, the several reagent droplets S shown in FIG. 10 represent either separate reagent droplets that have been discretized from continuous-flow source 92, or a single reagent droplet S movable to different locations on the electrode arrays over time and along various flow paths available in accordance with the sequencing of the electrodes.

It will be understood that the droplet manipulative operations depicted in FIG. 10 can advantageously occur on the electrode arrays as described hereinabove. Such arrays can be fabricated on or embedded in the surface of a microfluidic chip, with or without other features or devices. Through appropriate sequencing and control of the electrodes of the arrays through communication with an appropriate electronic controller such as a microprocessor, sampling (including droplet formation and transport) can be done in a continuous and automated fashion.

In FIG. 10, the liquid inputs of continuous-flow sources 91 and 92 are supplied to the electrode arrays at suitable injection points. Utilizing the electrowetting based techniques described hereinabove, continuous liquid inputs 91 and 92 are fragmented or discretized into trains of sample droplets S or reagent droplets R of uniform sizes. One or more of these newly formed sample droplets S and reagent droplets R can then be manipulated according to a desired protocol, which can include one or more of these fundamental MOVE, MERGE/MIX, and SPLIT operations described hereinabove, as well as any operations derived from these fundamental operations. In particular, the invention enables sample droplets S and reagent droplets R to be diverted from continuous liquid inputs 91 and 92 for on-chip processes. For example, FIG. 10 shows droplets being transported along programmable flow paths across the microfluidic chip to one or more functional regions situated on the surface of microfluidic chip such as regions 93, 94, 95 and 96. A functional region here is defined as the area where two or more electrodes intersect.

Functional region 93 is a mixer where sample droplets S and reagent droplets R are combined together. Functional region 94 can be a reactor where the sample reacts with reagent. Functional region 95 can be a detector when signals such as fluorescence can be measured from the reacted sample/reagent droplets. Finally, functional region 96 can be a storage place where droplets are collected after detection and/or analysis are complete.

Functional regions 93 to 96 preferably comprise one more electrodes intersection areas on the arrays. Such functional regions 93 to 96 can in many cases be defined by the sequencing of their corresponding control electrodes, where the sequencing is programmed as part of the desired protocol and controlled by an electronic control unit communicating with the microfluidic chip. Accordingly, functional regions 93 to 96 can be created anywhere on the electrode arrays of the microfluidic chip and reconfigured during run-time.

Several advantages associated with this invention can be easily seen from the above mentioned example.

This design allows sample analysis to be decoupled from the sample input flow.

Multiple analytes can be measured concurrently. Since continuous liquid flow 91 is fragmented into sample droplets S, each sample droplet S can be mixed with a different reagent droplet and conducted to a different test site on the chip to allow concurrent measurement of multiple analytes in a single sample without cross-contamination.

Multiple different types of analyses can be performed using a single chip.

Calibration and sample measurement can be multiplexed. Calibration droplets can be generated and measured between samples. Calibration does not require cessation of the input flow, and periodic recalibration during measurement is possible. Moreover, detection or sensing can be multiplexed for multiple analytes.

The sample operations are reconfigurable. Sampling rates, mixing ratios, calibration procedures, and specific tests can all by dynamically varied during run time.

It should be mentioned here that the above described example and the above mentioned advantages are by no means exhaustive. The flexible nature of this invention can be utilized for many applications and does have a lot of advantages comparing other technologies such as channel-based microfluidics.

All printed patents and publications referred to in this application are hereby incorporated herein in their entirety by this reference.

While the preferred embodiment of the invention has been illustrated and described, it will be appreciated that various changes can be made therein without departing from the spirit and scope of the invention.

The invention claimed is:

1. An apparatus for liquid manipulation, comprising (a) a substrate comprising a first substrate surface;

(b) a first array of elongated drive electrodes disposed on the first substrate surface, wherein spacing between adjacent elongated drive electrodes of the first array is from approximately 0.005 mm to approximately 10 mm;

(c) a first dielectric layer disposed on the first substrate surface to cover the first array of drive electrodes;

(d) a second array of elongated drive electrodes, substantially perpendicular to the first array, disposed on the first dielectric layer, wherein spacing between adjacent elongated drive electrodes of the second array is from approximately 0.005 mm to approximately 10 mm, wherein the first dielectric layer separates the first array of elongated drive electrodes and the second array of drive electrodes;

(e) a second dielectric layer disposed on the first substrate surface to cover the second array of drive electrodes; and (f) an electrode selector for sequentially activating and de-activating one or more selected drive electrodes of the two arrays to sequentially bias the selected drive electrodes actuation voltages, whereby a droplet disposed on the substrate surface moves along a desired path defined by the selected drive electrodes.

2. The apparatus according to claim 1 comprising a plate spaced from the first substrate surface by a distance to define a space between the plate and the substrate surface, wherein the distance is sufficient to contain a droplet disposed in the space.

3. The apparatus according to claim 2 wherein the plate comprises a plate surface facing the first substrate surface.

4. The apparatus according to claim 3 wherein an electrode is disposed on the said plate surface.

5. The apparatus according to claim 4 wherein an electrically insulative, hydrophobic layer is disposed on the said electrode.

6. The apparatus according to claim 1 wherein at least a portion of the second dielectric layer is hydrophobic.

7. The apparatus according to claim 1, wherein the liquid is an electrolyte.

8. The apparatus according to claim 1 wherein the electrode selector comprises an electronic processor.

9. The apparatus according to claim 1 comprising a droplet inlet communicating with the surface.

10. The apparatus according to claim 9 comprising a droplet outlet communicating with the surface.

11. The apparatus of claim 1 wherein substantially perpendicular is perpendicular.

* * * * *